United States Patent [19]

Josefowicz

[11] Patent Number: 4,597,839
[45] Date of Patent: Jul. 1, 1986

[54] METHOD AND APPARATUS FOR PRODUCTION OF A METAL FROM METALLIC OXIDE ORE

[75] Inventor: Jack Y. Josefowicz, Westlake Village, Calif.

[73] Assignee: Atlantic Richfield Company, Los Angeles, Calif.

[21] Appl. No.: 561,401

[22] Filed: Dec. 14, 1983

[51] Int. Cl.[4] .......................... C25C 3/08; C25C 3/14; C21C 7/00
[52] U.S. Cl. ................................. 204/67; 204/243 R; 204/245; 204/284; 204/294; 266/216; 266/265
[58] Field of Search .................... 204/243 R, 245, 275, 204/285, 286, 287, 293, 294, 297 R, 284, 67, 129.46, 35, 70; 266/225, 265, 216; 373/122, 115, 46

[56] References Cited

U.S. PATENT DOCUMENTS

| | | | |
|---|---|---|---|
| 2,870,072 | 1/1959 | Merlub-Sobel | 204/64 |
| 3,278,410 | 10/1966 | Nelson | 204/285 |
| 3,682,798 | 8/1972 | Tuddenham et al. | 204/108 |
| 4,257,855 | 3/1981 | Zaromb | 204/67 |
| 4,338,177 | 7/1982 | Withers et al. | 204/245 X |
| 4,409,073 | 10/1983 | Goldberger | 204/245 X |
| 4,417,962 | 11/1983 | Inoue | 204/129.46 |

FOREIGN PATENT DOCUMENTS

| | | | |
|---|---|---|---|
| 183316 | 1/1963 | Sweden | 204/67 |
| 600034 | 3/1948 | United Kingdom | 204/67 |

*Primary Examiner*—Donald R. Valentine

[57] ABSTRACT

An anode of reducing agent material particulates is introduced into an electrolytic solvent bath under compression. The carbon material is selected such that there is a minimum number of particle contacts. In such a selection, the contact surface area is important and is determined primarily by particle size. The compression of the anode is maintained greater than about 5 psi.

20 Claims, 2 Drawing Figures

METHOD AND APPARATUS FOR PRODUCTION OF A METAL FROM METALLIC OXIDE ORE

BACKGROUND OF THE INVENTION

1. Field of the Invention

This invention relates to the electrolytic production of a metal from metallic oxide using a salt bath. More particularly, the invention relates to continuously producing a metallic halide using a unique anode under compression while depositing the metal at the cathode. More particularly, alumina is deposited by electrolytic deposition from the alumina oxide using energy-saving low electrical potentials.

Production of a metallic product by electrolysis may be illustrated by reference to the production of aluminum. The commercial production of aluminum is typically accomplished by the Hall-Heroult process. In this process, the purified source of alumina is dissolved in a molten all-fluoride salt solvent particularly consisting of cryolite, and then reduced electrolytically with a formed carbon anode according to the reaction:

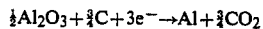

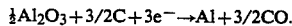

Four characteristics of the Hall-Heroult process include: (1) carbon dioxide being produced and a carbon anode being consumed at the rate of 0.33:1 pound of carbon per pound of aluminum produced, which results in a required continual movement of the formed carbon anode downwardly toward the cathode aluminum pool at the bottom of the cell to maintain constant spacing for uniform aluminum production and thermal balance in the cell; (2) the need to feed intermittently and evenly solid alumina in a limited concentration range to the open cell to maintain peak efficiency of operation and in order to avoid the anode defects; (3) severe corrosion of the cell materials due to high temperatures of 950° to 1000° C. in the fluoride bath resulting in low cell life and increased labor; and (4) cell power efficiency is limited to less than 50% since a carbon-anode-to-liquid-aluminum distance greater than one inch to reduce magnetic fields' undulation of the aluminum layer which would cause intermittent shorting and result in Faradaic losses due to a back reaction of aluminum droplets with carbon dioxide to produce alumina.

It is known that, in the Hall-Heroult cell reaction, the carbon of the anode contributes to the overall reaction of winning aluminum by decreasing the decomposition voltage. For example, the decomposition of $Al_2O_3$ in cryolite on a platinum anode is about 2.2 volts, but on a carbon electrode the decomposition voltage is about 1.2 volts.

In the all-fluoride-containing bath, the alumina will dissolve in the cryolite-fluoride salt bath at a temperature of 950° to 1000° C. Bayer alumina is soluble in a cryolite-containing bath at a temperature of at least 900° C. A fluoride-containing bath having a temperature below about 900° C. will not readily solubilize ordinarily processed Bayer alumina and, therefore, the alumina, as a source of aluminum, cannot enter the reduction reaction nor is it possible for the aluminum to be deposited at the cathode.

2. Pertinent Art

Pertinent art is illustrated by the process described in U.S. Pat. No. 4,257,855 ('855), which discloses an electrolytic cell for the production of aluminum metal including a permanent hollow anode structure of corrosion-resistant material, with numerous perforations in the base of the structure, a packed bed of consumable carbon pieces supported by the base within the hollow space of the structure, a molten cryolite bath, means for adding fresh pieces of the consumable carbon to replenish the packed bed, and means for adjusting the depth of immersion of the packed bed within the molten cryolite bath so as to reduce voltage and energy requirements or increase the rate of aluminum production. The structure in this disclosure is the current carrying the anode and the carbon pieces are the supply of reducing material.

Pertinent art is further illustrated in International Publication No. WO87/00170, which discloses a process for the electrolytic reduction of aluminum from alumina using a carbon cathode disposed in a molten salt electrolyte solvent bath in which the alumina has been dissolved and which has a density less than the reduced molten aluminim. The steps of the process include continuously providing a particulate, free-flowing, high purity, and highly conductive carbon material to the molten bath to serve as the anode. The particulate carbon material has a density less than the molten bath. An electrical connection is placed in contact with the particulate carbon anode material and an electric current is applied. Reduced aluminum is collected at the cathode. The particulate carbon material is preferably formed from desulfurized petroleum coke which may be partially graphitized. The particulate material is required to have a lower density than the molten electrolytic bath such that it floats on the bath surface. It is also preferred that the material be relatively nonreactive with oxygen.

Pertinent art also includes U.S. Pat. No. 2,764,530 ('530), which discloses use of petroleum coke in an aluminum electrolytic process, the coke having an acceptable level of specific resistivity of about 0.0019 ohms per cubic inch. The patent, however, discloses the use of pitch with the petroleum coke and finds that use of 100 mesh ground coal without the pitch has unacceptably high specific resistance. The coal is ground treated carbon tetrachloride and acid, and mixed with pitch to achieve an acceptable level of resistivity.

SUMMARY OF THE INVENTION

Therefore, in view of the above, it is an object of the present invention to provide an improved electrode apparatus for recovery of a metal from a metal oxide ore.

It is a further object of this invention to provide an energy efficient metallurgical process for recovery of a metal from a metal oxide ore.

The method of supplying consumable particulate carbon material to a metal-producing electrolytic cell of this invention includes the steps of introducing particulate reducing agent material into a permanent hollow structure to form a packed bed of particulate material within the structure; submersing the lower portion of the structure and of the packed bed in a molten salt bath of the electrolytic cell; compressing the packed bed of particulate material; and causing electric current to flow into said packed bed and thence through said molten salt bath to a cathode of said electrolytic cell so as to form the metal near said cathode.

The apparatus of this invention for the electrolytic reduction of aluminum compounds to produce aluminum metal includes a hollow structure formed with numerous openings through its base and being adapted to contain particulate, conductive reducing material within its hollow space and supported by the base, means for adding the particulate material and a means for compressing the particulate material against the structure.

BRIEF DESCRIPTION OF THE DRAWINGS

The present invention is illustrated in the accompanying drawings wherein.

DESCRIPTION OF THE PREFERRED EMBODIMENT

As used throughout the detailed description, the term "alumina" in general also covers metal oxides, and "carbon" in general also covers reducing agents.

Figure 1:
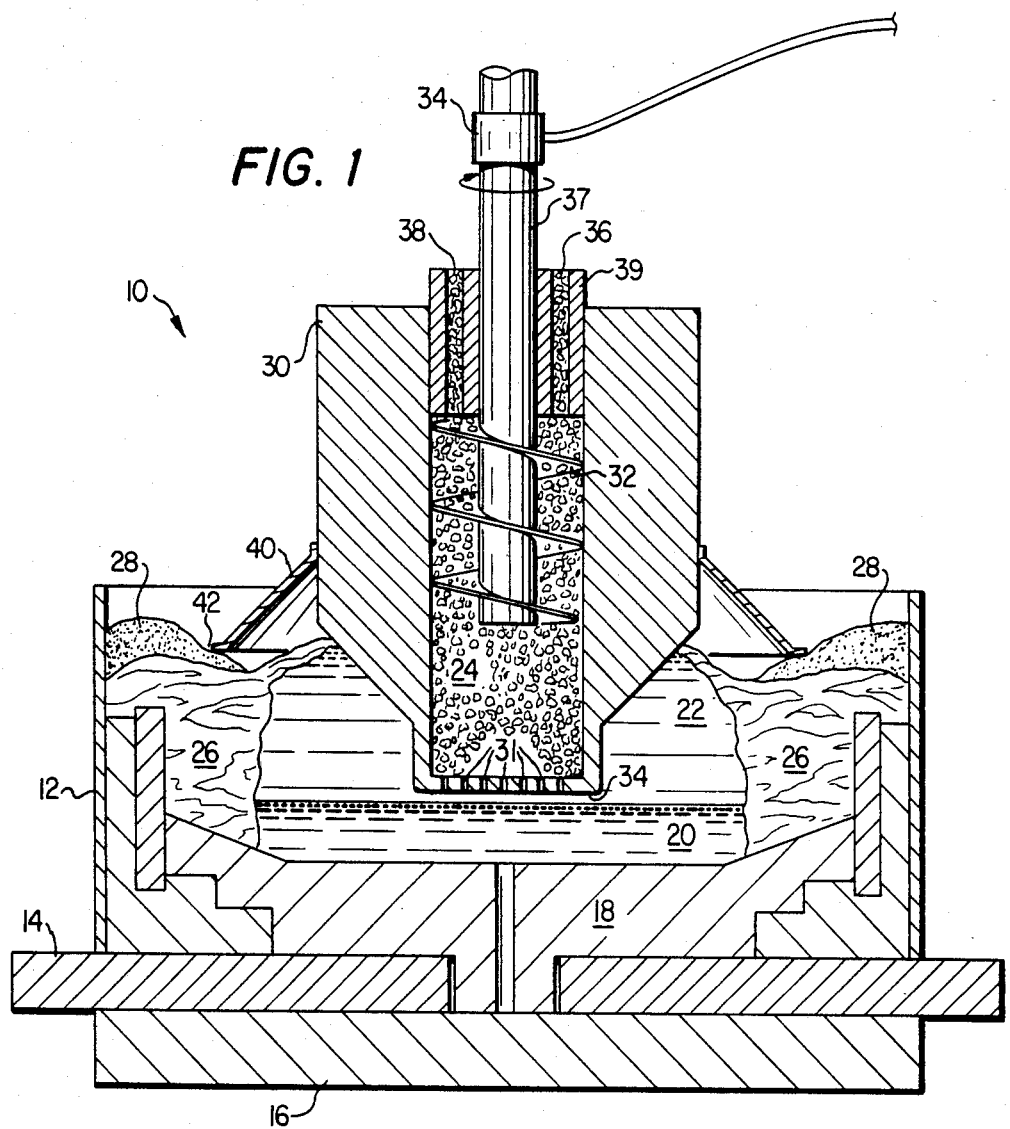
FIG. 1 is a schematic embodiment of the electrolytic cell of the present invention containing an electrode being used as an anode and having a means for maintaining the electrode in compression.

Referring to FIG. 1 of the drawings, wherein an electrolytic cell generally 10 for the electrolytic reduction of aluminum metal from an aluminous ore such a alumina or aluminum halides is shown, cell 10 includes a container 12 having a cathode collector bar 14 disposed at the bottom of the cell. The cathode collector bar 14 is insulated at the bottom surface thereof with insulation 16. Disposed oppositely from insulation 16 and on the upper surface of cathode collector bar 14 is a carbon cathode 18 which accommodates a pool of reduced molten aluminum 20 therein. Floating on top of the molten aluminum 20 is an electrolyte bath 22 and immersed in electrolyte bath 22 is a hollow structure 30 which may be either tubular or, preferably, have a square or rectangular horizontal cross-section conforming to the shape of the electrolytic cell 10. Carbon and alumina particles 24 fill most of the hollow space within hollow structure 30. Perforations 31 through the base 34 of structure 30 permit the electrolyte bath 22 within the electrolytic cell 10 to submerse the lower portion of carbon and alumina particles 24 and thereby make electrolytic contact with the submersed particle.

At the periphery of electrolyte bath 22, and where the temperatures are lower, the electrolyte bath 22 is in a frozen condition, as shown at 26, and may be covered with a covering 28 of the frozen material 26 of the aluminum compound which has also been dissolved in the electrolyte bath 22. Means for supplying carbon particulate material (not shown) provides the material via inlets 36 and 38. The hollow structure 30 is provided with a central rotating screw 32 therein for advancing the carbon particulate material 24 and held within sleeve 39 is a shaft 37 which is connected to screw 32.

Shaft 37 is also suitably connected to a source of electric current (not shown) at terminal 34. Also, hollow structure 30 may be supplied with a gas collecting skirt 40 which is preferably a truncated cone in shape and is sealingly connected to the hollow structure 30. The lower peripheral edges 42 of skirt 40 are embedded in and covered by the metallic compound covering 28 which is disposed over the frozen electrolyte 26. Gases generated by carbon particulate material 24 are trapped beneath skirt 40 for collection and venting.

Figure 2:
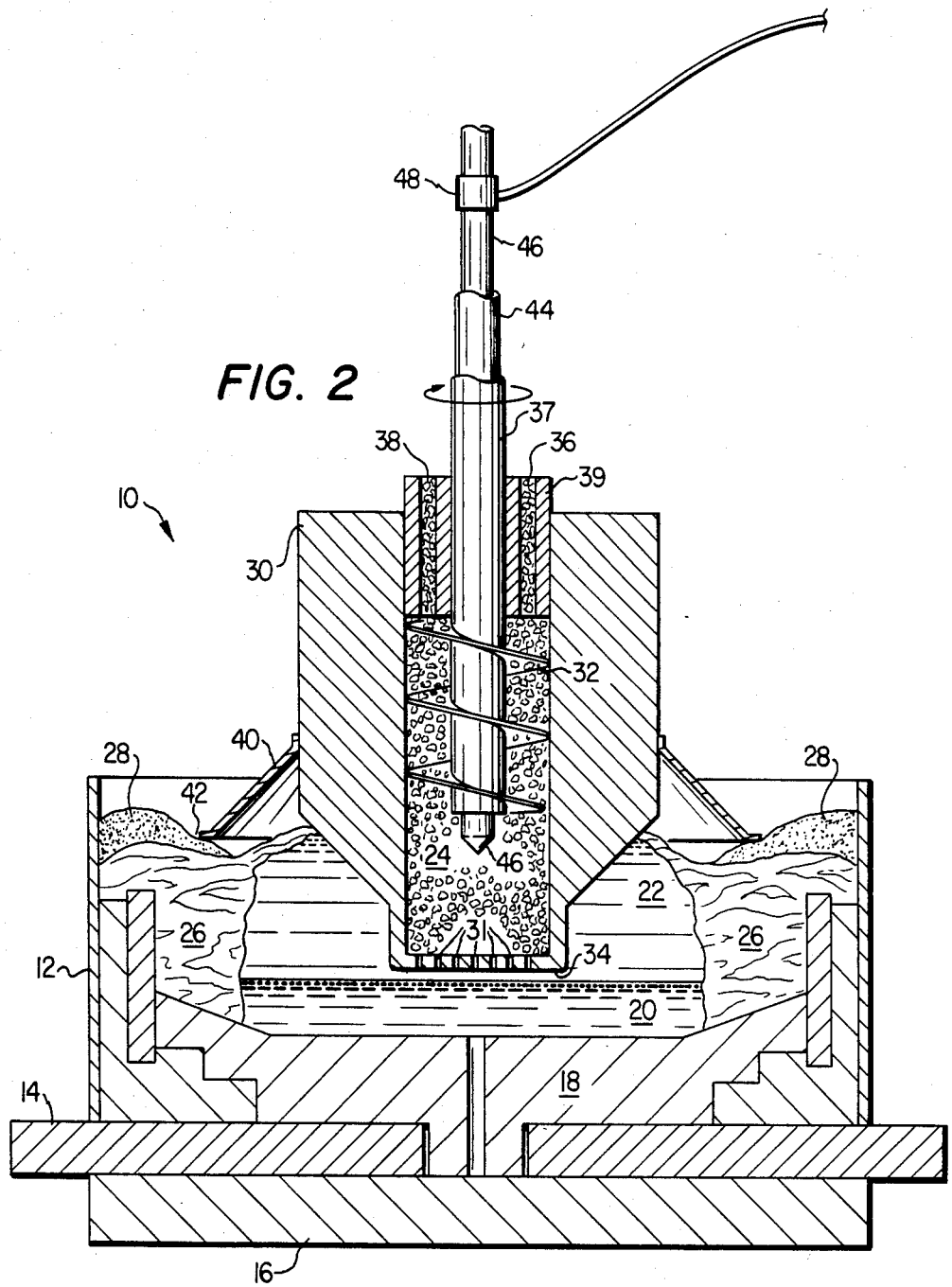
FIG. 2 is a second schematic embodiment of this electrolytic cell of the present invention containing a second means for supplying electric current to the particulate carbon material.

Alternatively, as shown in FIG. 2 of the drawings, shaft 37 and screw 32 may be provided with a coaxial electrically insulated aperture 44 in which is situated a probe 46 for supplying electrical current to the particulate material 24. The probe 46 may be stationary or rotating with the shaft 37 and screw 32. The probe 46 is connected to an electrical current source (not shown) at terminal 48 and extends into particulate material 24, and preferably into the electrolyte bath 22.

Alternatively, the container 12 may be insulated and covered to engage skirt 40 or hollow structure 30 so as to eliminate the cover 28 and the frozen electrolyte 26. Preferably, this would eliminate external heating of the electrolyte bath 22 or permit increased spacing between the particulate material 24 and the cathode 18.

The reducing agent used in accordance with the present invention is not limited to any particular material, but could be any materials known to be effective to react with oxide of the metal to be recovered in the process. In the case of an aluminum chloride bath, the reaction is aluminum oxide to aluminum chloride with generation of an oxide gas. The reaction in the fluoride bath is not clearly defined and it may be that the reducing agent reacts with the aluminum oxide to produce aluminum ions.

Among the reducing agents that are particularly useful for electrolysis of alumina and other metal oxides is carbon. Carbon is particularly preferred because it has the dual capacity of carrying current to the reaction site of the aluminum oxide, as well as acting as a reducing agent. A source of carbon in the intermixture can be any organic material having a fossil origin such as coke, coal or coal products.

The method and apparatus of this invention is particularly useful on alumina, $Al_2O_3$, but it also could be any aluminum oxide-bearing material such as bauxite or a clay such as kaolin or other material which would react at the anode to produce aluminum chloride or to be reduced to molten metal, as in the fluoride cycle process.

As shown in FIG. 1, the apparatus and methods of the present invention use particulates of carbon, rather than bulk-fabricated shapes of carbon as the anode of material. The particular carbon particles which are usable in the method of the present invention should have suitable physical characteristics to provide the needed operating requirements of the electrolysis process. More specifically, the particulate carbon should have preselected particle size ranges. Yet further, for the purpose of conducting the improved methods of electrolysis of the present invention, the particles of carbon preferably should flow freely in the dry state. The free-flowing particulates can be introduced into the electrolysis cell as needed to maintain a steady state electro-chemical reaction condition.

The base 34 of hollow structure 30 may consist of a porous membrane for supporting the anodic material and for providing a holding means against which the anode material could be advanced into the electrolytic bath to permit compression of the anodic particulates. In the instance of the particulate materials, a screw type conveyor would be most useful to advance the material.

The characteristics of particulate material 24 to be used by the method described are extremely important to the successful performance of the electrolysis cell. The particulate material should have low electrical resistivity to minimize the internal energy losses within the current-carrying circuit. The particulate material should also have a relatively low thermal conductivity to minimize heat losses through the column of particulates and the electrode housing. Of critical importance is the particle size of particulate material 24. The particle size of the particulate material 24 should range from about 5 to about 50 mesh (W. S. Standard Sieve). Preferably, the particle size should range from about 5 to about 25 mesh. More preferably, the particulate material should have a particle size range from about 10 to about 20 mesh.

The anode material—that is, the particulates—of this invention should be maintained under compression during electrolysis. Preferably, the compression forces are applied externally. The compression should be adequate to deform the carbon particles to cause increased contact area therebetween. Preferably, the compression force is at least 5 psi, and more preferably the force is at least 10 psi.

The rate of feeding reducing agent in the anode should be maintained to cause the process to avoid the anodic effect. In an aluminum process, the weight ratio of reducing agent to aluminum oxide should be above about 0.4:1. Preferably, for purposes of the present invention, the rate of reducing agent feed should be about 0.5:1 to 0.7:1 by weight reducing agent to alumina.

The material for cathode 18 is preferably a carbon block. To avoid electrolytic attack of hollow structure 30, its lower portion 9 in contact with molten cryolite is preferably made of an electrically nonconductive refractory material such as boron nitride or aluminum nitride. The particulate carbon 24 is fed through hollow structure 30 on demand.

In the prior art, the size and surface area of the particles making up the anode have not been disclosed to have any sensitivity regarding reaction rate. It is an important aspect of this invention, however, that the size of the carbon particles be controlled such that the electrical conductivity is maintained. It is another important aspect of this invention that the contact surface area be controlled for the particulates. It is generally desired to utilize a carbon reducing agent having a surface area of between about 10 and about 125 meters per gram.

It is therefore seen from the above that the present invention provides an improved process and apparatus for recovery of aluminum from aluminous ore by combined metallurgical and electrolytical techniques. It is also estimated that the capital cost for such a process is about the same or slightly less than that of the conventional Hall-Heroult process and that the process and apparatus of this invention may be economically retrofitted into the current commercial Hall-Heroult process apparatus.

It is understood that, although the present invention has been described in terms of particular materials and process steps, changes and modifications can be made in accordance with known techniques and materials by one skilled in the art within the scope of the following claims.

The invention which is claimed is:

1. An apparatus for the electrolytic reduction of metallic oxide compounds to produce a metal comprising a hollow structure formed with numerous openings through its base and being adapted to contain particulate, conductive reducing agent material within its hollow space and supported by said base, wherein the lower portions of said hollow structure and of said particulate material are immersed in a molten salt bath, and wherein said immersed lower portion of said hollow structure is made of an electrically nonconductive material substantially resistant to corrosion in said molten bath; means for adding said particulate material; and structural means operable within said hollow structure for compressing and deforming said particulate material against said structure.

2. The apparatus of claim 1 comprising means for supplying current to said compressed particulate material in said apparatus.

3. The apparatus of claim 1 wherein said electrical source is applied via said structural means.

4. An electrode apparatus useful in an electrolytic cell for electrodeposition of a metal from a molten electrolyte comprising:
 a source of electrical current;
 a cathode for the deposition of said metal;
 an anode containing a reducing agent in contact with an oxygen-containing compound of said metal; said agent present in an amount sufficient to react with said metal compound and to form thereafter said metal at said cathode; said reducing agent having a particle size between about 5 and about 50 mesh; and
 a structural means operable within said anode for mechanically compressing and deforming said reducing agent during said electrolysis.

5. The apparatus of claim 4 wherein said structural means comprises a rotating screw positioned within said anode.

6. The apparatus of claim 5 wherein said structural means compresses said reducing agent to at least 5 psi.

7. The apparatus of claim 6 wherein said structural means compresses said reducing agent to at least 10 psi.

8. The apparatus of claim 4 wherein the particle size of said reducing agent ranges between about 5 and about 25 mesh.

9. The apparatus of claim 8 wherein said particle size of said reducing agent ranges between about 10 and about 20 mesh.

10. The apparatus of claim 4 wherein said metal compound is selected from a group consisting of alumina, bauxite, clay, aluminum-containing oxides, and mixtures thereof.

11. The apparatus of claim 4 wherein said reducing agent comprises a carbon-containing compound.

12. The apparatus of claim 4 wherein said metal is aluminum.

13. A process for electrolytically depositing a metal from a molten electrolyte comprising the steps of introducing particulates of a reducing agent into a container immersed in said molten electrolyte, providing an electrical current to said particulates of said reducing agent; and compressing said particulates to a pressure sufficient to deform same while said electrical current is being applied; said reducing agent having a particle size between about 5 and about 50 mesh.

14. The process of claim 13 wherein said pressure on said particulates is at least about 5 psi.

15. The process of claim 13 wherein said pressure on said particulates is at least 10 psi.

16. The process of claim 13 wherein particle size of said reducing agent ranges between about 5 and about 25 mesh.

17. The process of claim 16 wherein said particle size of said reducing agent ranges between about 10 and about 20 mesh.

18. The process of claim 13 wherein said metal compound is selected from a group consisting of alumina, bauxite, clay, and other aluminum-containing oxides, and mixtures thereof.

19. The process of claim 13 wherein said reducing agent comprises a carbon-containing compound.

20. The process of claim 13 wherein said metal is aluminum.

* * * * *